(12) United States Patent
Nebbia Colomba et al.

(10) Patent No.: US 11,235,964 B2
(45) Date of Patent: Feb. 1, 2022

(54) SEALING SYSTEM FOR FOOD APPLICATIONS

(71) Applicant: Aktiebolaget SKF, Gothenburg (SE)

(72) Inventors: Alessio Nebbia Colomba, Pisa (IT); Fausto Baracca, Massa (IT); Fabio Falaschi, Carrara (IT); Pasquale Frezza, Aversa (IT)

(73) Assignee: Aktiebolaget SKF

( * ) Notice: Subject to any disclaimer, the term of this patent is extended or adjusted under 35 U.S.C. 154(b) by 231 days.

(21) Appl. No.: 16/374,812

(22) Filed: Apr. 4, 2019

(65) Prior Publication Data

US 2019/0330035 A1 Oct. 31, 2019

(30) Foreign Application Priority Data

Apr. 27, 2018 (IT) .................... 102018000004906

(51) Int. Cl.
| | |
|---|---|
| *B67B 3/02* | (2006.01) |
| *A23L 3/00* | (2006.01) |
| *B65B 7/28* | (2006.01) |
| *B65D 39/00* | (2006.01) |
| *B65D 39/02* | (2006.01) |
| *B65D 53/06* | (2006.01) |

(52) U.S. Cl.
CPC .............. *B67B 3/026* (2013.01); *A23L 3/001* (2013.01); *B65B 7/2842* (2013.01); *B65D 39/0029* (2013.01); *B65D 39/02* (2013.01); *B65D 53/06* (2013.01)

(58) Field of Classification Search
CPC ....... B67B 3/026; A23L 3/001; B65B 7/2842; B65D 39/0029; B65D 39/02; B65D 53/06
See application file for complete search history.

(56) References Cited

U.S. PATENT DOCUMENTS

| | | | |
|---|---|---|---|
| 4,535,996 A | 8/1985 | Cardis et al. | |
| 4,625,978 A * | 12/1986 | Jelinek | F16L 17/073 |
| | | | 277/641 |
| 5,118,121 A * | 6/1992 | Hellman, Sr. | F16J 15/0806 |
| | | | 277/650 |
| 5,121,932 A * | 6/1992 | Goldman | F16J 15/127 |
| | | | 123/90.37 |
| 5,236,205 A * | 8/1993 | Chen | B29D 99/0053 |
| | | | 277/596 |

(Continued)

FOREIGN PATENT DOCUMENTS

| | | |
|---|---|---|
| CN | 107906282 A | 4/2018 |
| DE | 3927340 C1 | 10/1990 |

*Primary Examiner* — Eugene G Byrd
(74) *Attorney, Agent, or Firm* — Reed Smith LLP

(57) ABSTRACT

A sealing system for food applications that provides a housing element with two or more bolts and respective holes for clamping. A flanged element is clamped to a frame of a machine, and a rubber seal placed along the base perimeter of the housing element. The seal includes a first portion of the rubber profile placed in the areas distant from the holes and a second portion of the rubber profile adjacent to the holes. The rubber profile of the second portion has a larger cross section than that of the first portion, such that the deformations of the rubber profile are made virtually uniform to prevent the formation of fractures, and therefore of bacteria traps, in the rubber.

5 Claims, 4 Drawing Sheets

(56) References Cited

U.S. PATENT DOCUMENTS

| | | | | |
|---|---|---|---|---|
| 5,536,023 | A * | 7/1996 | Surbrook | F16J 15/061 |
| | | | | 277/593 |
| 6,536,775 | B1 * | 3/2003 | Inciong | F16J 15/123 |
| | | | | 277/596 |
| 6,543,787 | B1 * | 4/2003 | Inciong | F02F 11/00 |
| | | | | 277/593 |
| 6,682,081 | B2 * | 1/2004 | Burton | F16L 23/22 |
| | | | | 277/602 |
| 7,063,327 | B2 * | 6/2006 | Salameh | F16J 15/064 |
| | | | | 277/590 |
| 7,070,187 | B2 * | 7/2006 | Boeve | F02F 11/002 |
| | | | | 277/598 |
| 7,306,235 | B2 * | 12/2007 | Roberts | F16J 15/061 |
| | | | | 277/593 |
| 9,269,933 | B2 * | 2/2016 | Yamamoto | F16J 15/061 |

* cited by examiner

SEALING SYSTEM FOR FOOD APPLICATIONS

CROSS-REFERENCE

This application claims priority to Italian patent application no. 102018000004906 filed on Apr. 27, 2018, the contents of which are fully incorporated herein by reference.

TECHNOLOGICAL FIELD

The present invention relates to a sealing system for food applications, particularly a system for sealing between mechanical components clamped to a machine frame. More particularly, the shape that has been developed makes it possible to avoid cracks in the rubber of the seal, on the outer perimeter of the clamped element, thus preventing the formation of bacteria traps.

BACKGROUND

As is known, in the food and beverages (known simply as F&B, from the English "Food and Beverages") industry, there is increasing interest in the development of new machinery and designs for machinery intended to improve the safety and quality of food. One of the guidelines written by an engineering design group called the European Hygienic Engineering and Design Group (EHEDG) shows how the conventional O-ring or rubber seal commonly used on the market is a risk in the food sector, because of the possibility of creating cracks or small cavities which are completely impossible to clean, and which consequently allow bacterial growth inside them.

At the present time, in the range of F&B products for Y-type pads, neither the present applicant nor other competitors in the F&B field offer solutions for effective sealing between the base of a housing element clamped against the frame of a machine. The only "palliative" used on the market at present is that of using a composite and completely filled base of the element, instead of using a version having one or more cavities. Clearly, this cannot be considered a solution, since the cost is prohibitive.

Indeed, it is not a simple matter to develop a rubber sealing profile for use on all the shapes of housing elements offered in the range of products for food use.

To provide a sealing solution that avoids the creation of bacteria traps between the housing element and the machine frame, the EHEDG working group has suggested a shape of the seal to be placed along the whole base perimeter of the housing element.

This solution has also proven to be unsatisfactory. Inspection of the initial samples of the housing elements has revealed that the rubber did not behave as expected. Indeed, the rubber was deformed in a differential way, and therefore did not succeed in avoiding the creation of bacteria traps in the area of the clamping bolts.

Consequently, there is a need to design a sealing system for food applications that is free of the afore drawbacks. In particular, there is a need to reduce the differential deformation of the sealing system, making it virtually independent of the load conditions.

SUMMARY

One object of the present invention is to provide a sealing system for food applications, for sealing between mechanical components clamped to a machine frame. In particular, the shape that has been developed makes it possible to avoid cracks in the rubber of the seal on the outer perimeter of the clamped element, thus preventing the formation of bacteria traps.

The object of the present invention is achieved by using a special rubber profile which is not constant along the whole perimeter of the housing element, by defining the most stressed areas for each embodiment of the invention and consequently the cross section of the rubber and implementing a transition between two different rubber section profiles.

Therefore, according to the present invention, a description is given of a sealing system for food applications, having the characteristics stated in the independent claim attached to the present description.

Further preferred and/or particularly advantageous embodiments of the invention are described according to the characteristics stated in the attached dependent claims.

BRIEF DESCRIPTION OF THE DRAWINGS

The invention will now be described with reference to the attached drawings, which show some non-limiting examples of the sealing system for food applications, in which.

DETAILED DESCRIPTION

Referring now to the figures, some housing elements forming part of the sealing system according to the invention are described below purely by way of example. These housing elements are used in food applications for being clamped against a machine frame and, together with an innovative rubber seal, shape the sealing system according to the present invention.

The idea for a solution on which the present invention is based arises from the analysis of the behavior of the rubber sealing system produced according to the suggestions of the EHEDG working group, that is to say a seal to be placed on the whole base perimeter of the housing element. In fact, it is evident from this analysis that, although the "standard" rubber profile behaves as predicted in the less "stressed" area, that is to say at a certain distance from the mounting bolts, the rubber profile is, on the contrary, excessively deformed at the position of the clamping bolts.

The idea for a solution is therefore that of implementing a special rubber profile which is not constant along the whole perimeter of the housing element, by defining the most stressed areas for each embodiment of the invention and consequently the cross section of the rubber and implementing a transition between two different rubber section profiles.

In particular, a first rubber profile with a larger cross section has been designed for implementation around the areas of the bolts, that is to say the areas that are much more stressed. The second profile, with a smaller cross section, corresponding to the specifications of the guidelines, has been retained throughout the remaining perimeter, to provide the same result, in terms of hygiene, in a less stressed area. In other words, the profile with the larger cross section (in the more stressed areas) makes it possible to produce deformations of the rubber having the same extent as the deformations produced in the less stressed areas, although the rubber profile has a smaller cross section in these areas. In other words, the principle of proportionality between the tensors of tension and the tensors of deformation of the material is used to produce virtually uniform deformations along the whole perimeter of the housing element. Theoretical considerations and experimental evidence have confirmed that the ratio between the two cross sections should preferably be between 1.25 and 1.8.

The sealing system is preferably made from a rubber having a hardness close to a value of 70 Shore A. This value was determined by conducting experimental tests of resistance to the ingress of water and detergent, using pressure washing.

Depending on the shape, the positioning of the transitions was modified to adapt to the specific characteristics of the shape of the housing.

Figure 1:
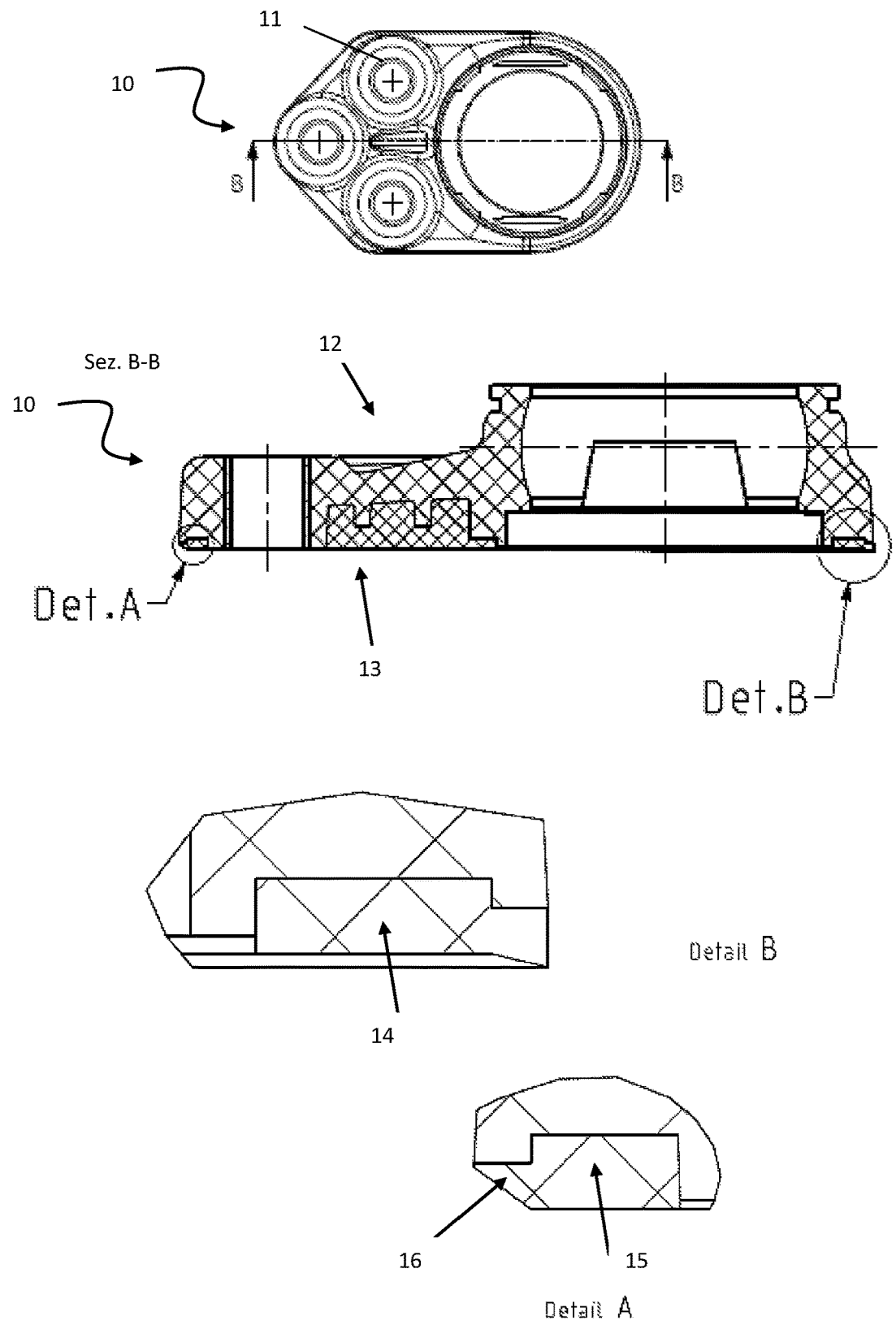
FIG. 1 shows, in a top view, a cross section and associated details, a three-bolt flanged element, forming part of a first embodiment of the invention.

According to a first embodiment of the invention (FIG. 1), the sealing system comprises a housing element which is a three-bolt flanged element 10, provided, precisely, with three holes 11 for bolts for clamping to the frame of a machine which is of a known type and is therefore not shown. The three-bolt flanged element 10 comprises a body 12. The sealing system further comprises a rubber seal 13 placed along the base of the three-bolt flanged element 10. As may be seen in detail B of FIG. 1, in the areas remote from the holes 11 for the clamping bolts, the first portion 14 of the rubber profile is constant and smaller than the second portion 15 of the rubber profile located adjacent to the holes 11 (detail A of FIG. 1). The ratio between the thicknesses of the second portion 15 and the first portion 14 is preferably between 1.25 and 1.8. Additionally, as it becomes more distant from the area of the holes, the rubber profile assumes a transitional cross section 16, decreasing as the distance from the area of the holes increases.

Figure 2:
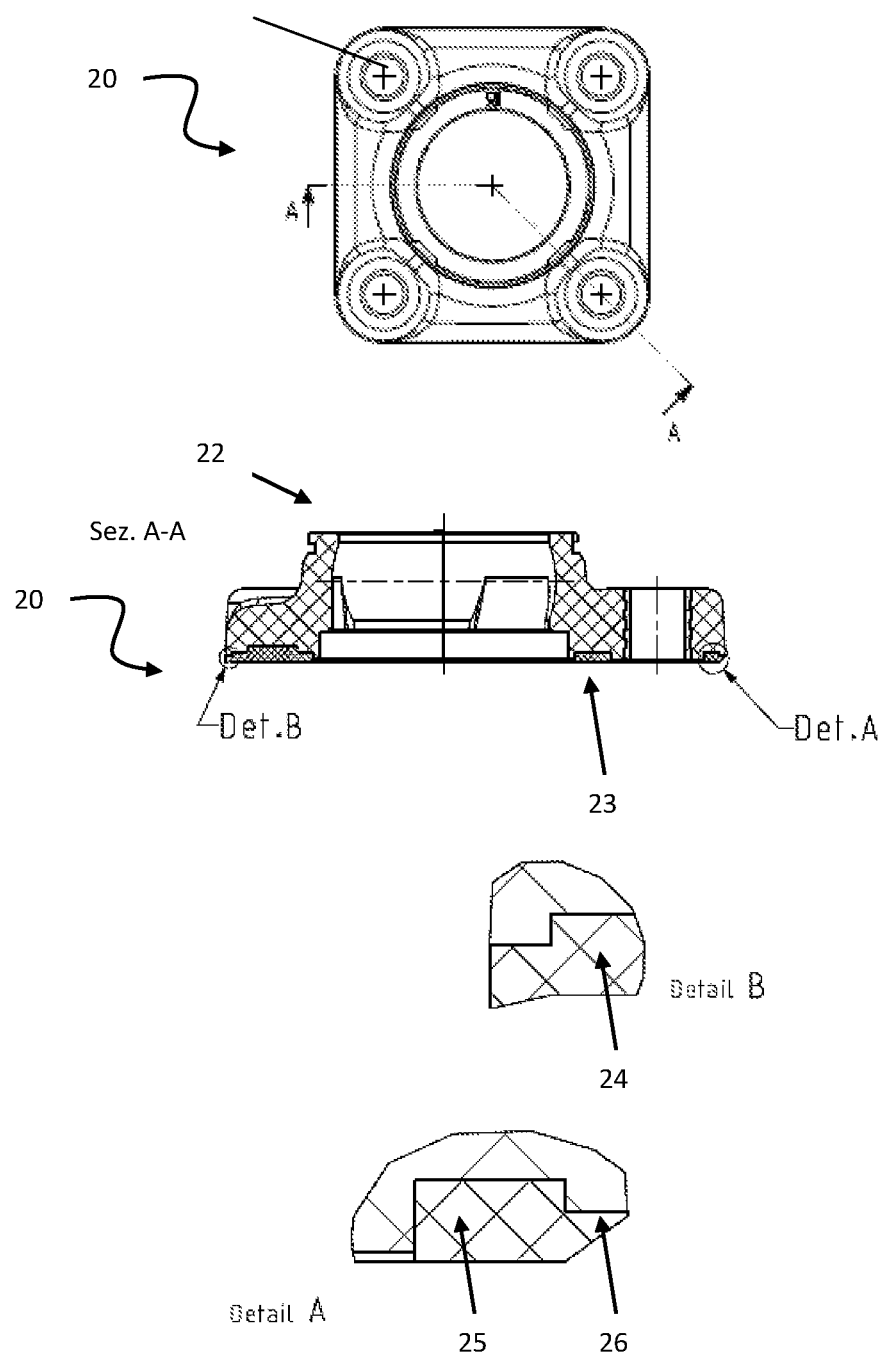
FIG. 2 shows, in a top view, a cross section and associated details, a square flanged element, forming part of a second embodiment of the invention.

In a second embodiment of the invention (FIG. 2), the sealing system comprises a housing element which is a square flanged element 20, provided with four holes 21 for bolts for clamping to the frame of a machine which is of a known type and is therefore not shown. The square flanged element 20 comprises a body 22. The sealing system further comprises a rubber seal 23 placed along the base of the square flanged element 20. As may be seen in detail B of FIG. 2, in the areas remote from the holes 21 for the clamping bolts, the first portion 24 of the rubber profile is constant and smaller than the second portion 25 of the rubber profile located adjacent to the holes 21 (detail A of FIG. 2). The ratio between the thicknesses of the second portion 25 and the first portion 24 is preferably between 1.25 and 1.8. Additionally, as it becomes more distant from the area of the holes, the rubber profile assumes a transitional cross section 26, decreasing as the distance from the area of the holes increases.

Figure 3:
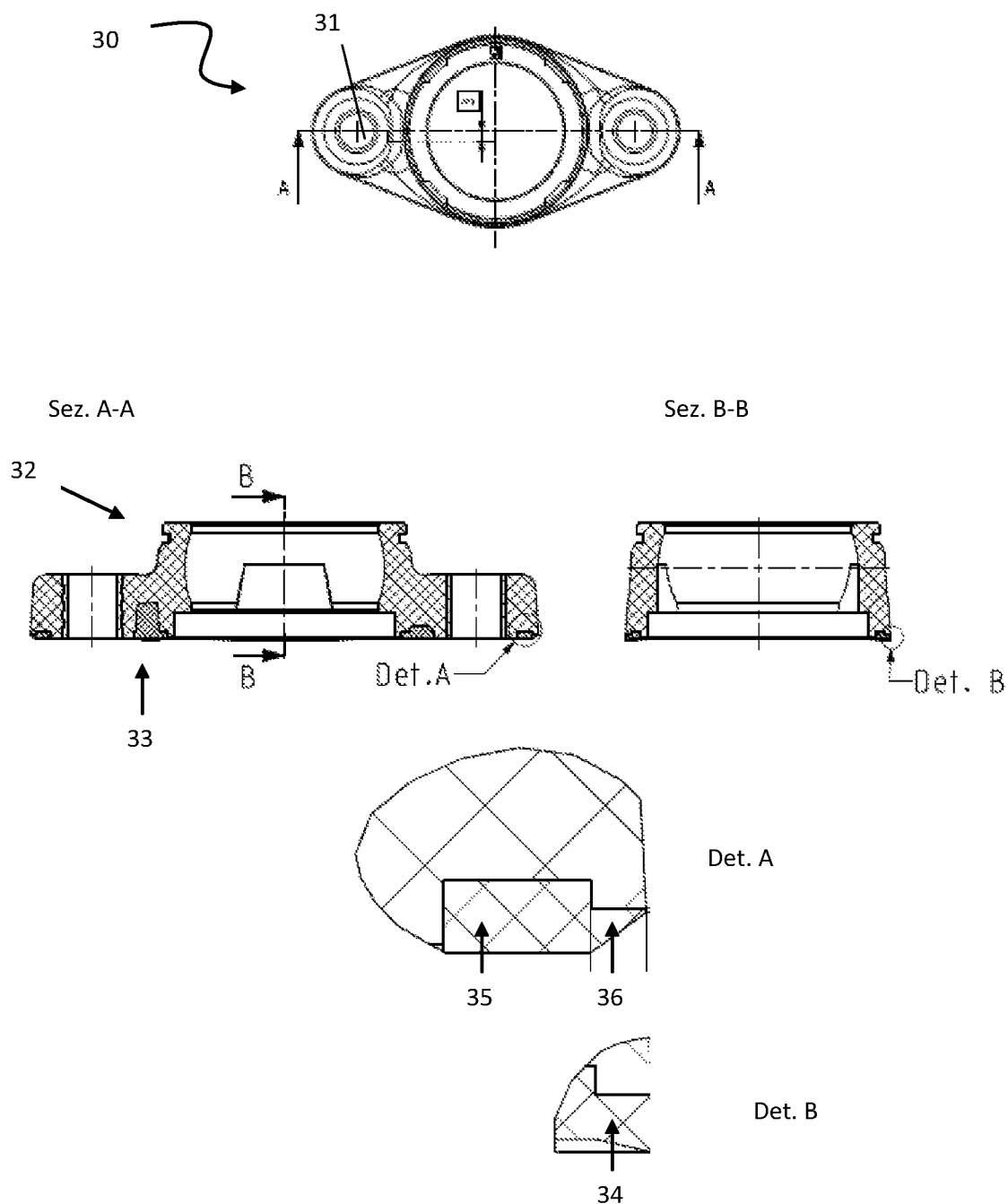
FIG. 3 shows, in a top view, cross sections and associated details, an oval flanged element, forming part of a third embodiment of the invention.

Similarly, according to a third embodiment of the invention (FIG. 3), the sealing system comprises a housing element which is an oval flanged element 30, provided with two holes 31 for bolts for clamping to the frame of a machine which is of a known type and is therefore not shown. The oval flanged element 30 comprises a body 32. The sealing system further comprises a rubber seal 33 placed along the base of the oval flanged element 30. As may be seen in detail B of FIG. 3, in the areas remote from the holes 31 for the clamping bolts, the first portion 34 of the rubber profile is constant and smaller than the second portion 35 of the rubber profile located adjacent to the holes 31 (detail A of FIG. 3). The ratio between the thicknesses of the second portion 35 and the first portion 34 is preferably between 1.25 and 1.8. Additionally, as it becomes more distant from the area of the holes, the rubber profile assumes a transitional cross section 36, decreasing as the distance from the area of the holes increases.

Figure 4:
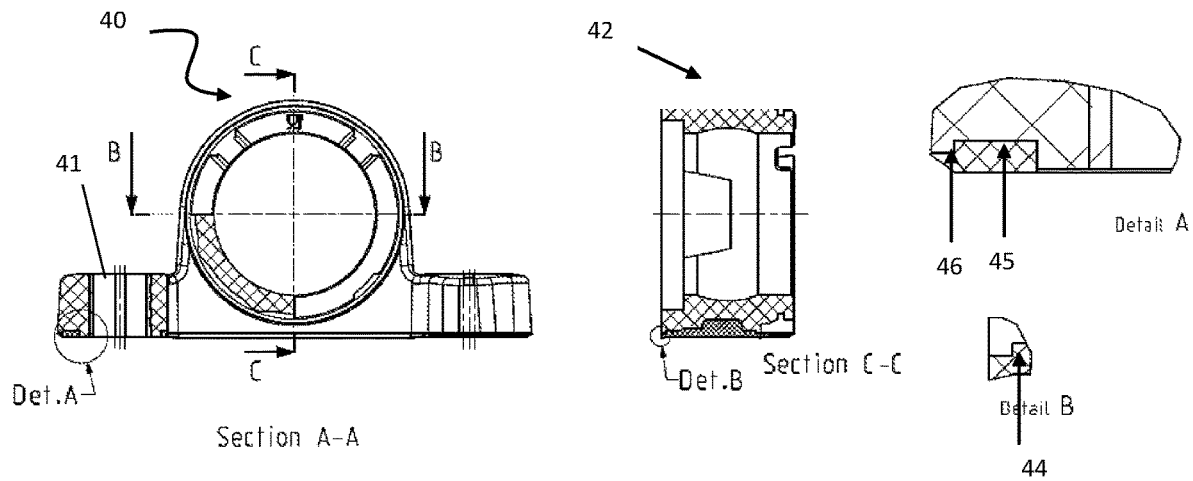
FIG. 4 shows, in cross sections and associated details, an upright support element, forming part of a fourth embodiment of the invention.

Similarly, according to a fourth embodiment of the invention (FIG. 4), the sealing system comprises a housing element which is an upright support element 40, provided with two holes 41 for bolts for clamping to the frame of a machine which is of a known type and is therefore not shown. The upright support element 40 comprises a body 42. The sealing system further comprises a rubber seal 43 placed along the base of the upright support element 40. As may be seen in detail B of FIG. 4, in the areas remote from the holes 41 for the clamping bolts, the first portion 44 of the rubber profile is constant and smaller than the second portion 45 of the rubber profile located adjacent to the holes 41 (detail A of FIG. 4). The ratio between the thicknesses of the second portion 45 and the first portion 44 is preferably between 1.25 and 1.8. Additionally, as it becomes more distant from the area of the holes, the rubber profile assumes a transitional cross section 46, decreasing as the distance from the area of the holes increases.

Figure 5:
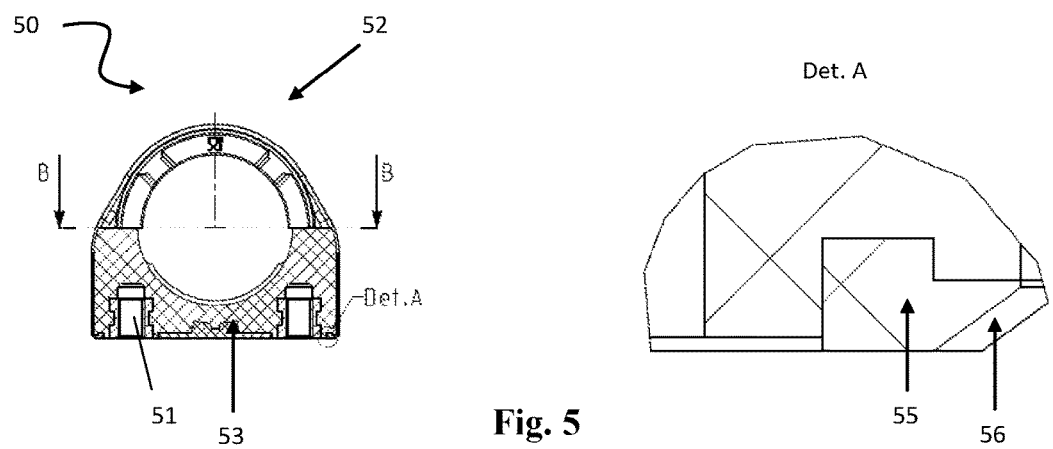
FIG. 5 shows, in a cross section and an associated detail, an upright support element with a short base, forming part of a fifth embodiment of the invention.

Similarly, according to a fourth embodiment of the invention (FIG. 5), the sealing system comprises a housing element which is an upright support element 50, provided with two holes 51 for bolts for clamping to the frame of a machine which is of a known type and is therefore not shown. The short-base upright support element 50 comprises a body 52. The sealing system further comprises a rubber seal 53 placed along the base of the short-base upright support element 50. In the areas remote from the holes 51 for the clamping bolts, the first portion 54 of the rubber profile is constant and smaller than the second portion 55 of the rubber profile located adjacent to the holes 51 (detail A of FIG. 5). The ratio between the thicknesses of the second portion 55 and the first portion 54 is preferably between 1.25 and 1.8. Additionally, as it becomes more distant from the area of the holes, the rubber profile assumes a transitional cross section 56, decreasing as the distance from the area of the holes increases.

The solution, presented in countless embodiments, has the evident advantage of providing a rubber profile which is deformed in a virtually constant way along the whole base perimeter of the housing element. This conforms to the provisions of the guidelines for ensuring a design that meets the requirements of hygiene, while avoiding any effect on other performance parameters such as the clamping torque during assembly.

In addition to the embodiments of the invention as described above, it should be understood that there are numerous other variants. It should also be understood that the embodiments are described purely by way of example, and do not limit the object of the invention, or its applications, or its possible configurations. On the contrary, although the above description enables a person skilled in the art to implement the present invention at least according to an example of configuration thereof, it should be understood that numerous variations of the components described could be devised without thereby departing from the object of the invention as defined in the attached claims, whether interpreted literally and/or according to their legal equivalents.

What is claimed is:

1. A sealing system for food applications comprising:
   a housing element comprising two or more clamping holes, each clamping hole configured to receive a bolt to clamp the housing element to a frame of a machine, and
   a rubber seal comprising a rubber profile arranged along an outer base perimeter of the housing element and having a cross-section, and wherein
   the rubber seal includes a first portion of the rubber profile arranged at the outer base perimeter of the housing element and located in an area away from the holes, and a second portion of the rubber profile arranged at the outer base perimeter of the housing element and located in an area adjacent to the holes, wherein the cross-section of the rubber profile is not constant along the outer base perimeter of the housing element, wherein the rubber profile of the second portion has a cross-section greater than the cross-section of the first portion to make deformations of the rubber profile uniform along the outer base perimeter of the housing element to prevent formation of fractures.

2. The system according to claim 1, wherein a ratio between a thickness of the second portion of the rubber profile and a thickness of the first portion of the rubber profile ranges between 1.25 and 1.80.

3. The system according to claim 1, wherein the rubber profile of the rubber seal comprises a transition section having a cross-section gradually decreasing away from the area adjacent to the holes of the housing element.

4. The system according to claim 1, wherein the rubber seal presents a hardness approximately equal to 70 Shore A.

5. The system according to claim 1, wherein the rubber seal is non-unitary with the housing element.

* * * * *